United States Patent [19]

Bolling et al.

[11] Patent Number: 5,295,510

[45] Date of Patent: Mar. 22, 1994

[54] DIVERTER VALVE

[75] Inventors: Michael G. Bolling, Charlotte, N.C.; Robert S. French, Lugoff, S.C.; R. Steven Rivenbark, Leland, N.C.

[73] Assignee: LCI Corporation, Charlotte, N.C.

[21] Appl. No.: 934,128

[22] Filed: Aug. 21, 1992

[51] Int. Cl.$^5$ .................... F16K 11/065; F16K 3/316
[52] U.S. Cl. ................ 137/625.48; 251/176; 251/193; 251/368
[58] Field of Search ............. 137/625.48; 251/170, 251/171, 368, 176, 193

[56] References Cited

U.S. PATENT DOCUMENTS

3,771,561 11/1973 Santamaria ............... 137/625.48 X
4,334,552 6/1982 Blanchard ............... 137/625.48
4,493,476 1/1985 Strickland et al. ....... 137/625.48 X
4,936,348 6/1990 Swanson et al. .

*Primary Examiner*—Arnold Rosenthal
*Attorney, Agent, or Firm*—Shefte, Pinckney & Sawyer

[57] ABSTRACT

An improved slide plate diverter valve having a manifold block and a backing plate with a linearly reciprocable slide plate sandwiched and clamped therebetween is provided with side rails between the manifold block and backing plate along opposite lengthwise sides of the slide plate secured by dowel pins to each thereof to rigidify the manifold block and backing plate against relative movement, eliminating any tendency of the backing plate to move relative to the manifold block in response to sliding actuation of the slide plate.

16 Claims, 4 Drawing Sheets

DIVERTER VALVE

BACKGROUND OF THE INVENTION

The present invention relates generally to diverter valves and, more particularly, to slide plate diverter valves of the type utilized in directing the flow of viscous materials such as molten thermoplastic polymers under relatively high pressures.

In many manufacturing operations involving the formation of products from molten thermoplastic material, e.g., plastic extrusion, injection molding, and blow molding operations, it is desirable, if not essential, that the operation be carried out on a continuous flow basis. Additionally, it is common practice in such operations to filter impurities from the thermoplastic material by passage through a suitable filtration unit. Necessarily, such filtration units require periodic cleaning and, accordingly, to accommodate such cleaning and also permit the manufacturing operation to proceed on a continuous basis, dual filters are typically utilized with a diverter valve situated in the flow line to selectively direct the fluid material through one of the filters while the other is inactive for periodic cleaning and maintenance and otherwise to serve as a back-up to the operating filter.

It is therefore critical in such manufacturing operations that the diverter valve be capable of functioning reliably over extended periods of time, which objective is complicated by the severe temperature and pressure conditions under which such valves often operate. In particular, molten thermoplastic materials often have temperatures in excess of 400 degrees Fahrenheit and even as high as 600 degrees Fahrenheit or more and often flow at pressures in excess of 1000 PSI up to 5000 PSI. Such materials may also be corrosive in nature. Other requirements placed on such valves are that their configuration must be such that the fluid flow characteristics do not differ between the alternate operating dispositions of the valve and, especially, the flow passageways through the valve must be configured to avoid any stagnation in the fluid flow which could cause certain thermoplastic materials to undergo changes in their physical or chemical character.

One such diverter valve which addresses these objectives in commercial practice is a diverter valve of the slide plate type disclosed in Blanchard U.S. Pat. No. 4,334,552. Basically, this valve provides a manifold defining inlet and outlet fluid flow passages opening at a sealing face thereof through respective ports, a slide plate defining a fluid flow passageway at a sealing face thereof in facing surface contact to the manifold sealing face, and a backing plate disposed at the opposite side of the slide plate to sandwich it between the backing plate and the manifold, with a plurality of bolts connecting the manifold and backing plate for clamping them together to hold the respective sealing faces of the manifold and the slide plate in metal-to-metal surface contact with substantially zero clearance therebetween. The Blanchard patent teaches that the bolts effectively function as a spring to enable the valve to absorb and accommodate fluctuations in fluid pressure.

Disadvantageously, it has been observed in practice that the valve of the Blanchard patent tends to suffer sticking of the slide plate making it difficult to move the slide plate smoothly and position it accurately, which is believed to be due to the clamping forces exerted by the valve on the slide plate. It has also been observed in practice that, during changeovers between the opposite limit positions of the slide plate, the valve will produce startlingly loud reports. While the cause of such reports has not been definitely determined, it is believed that the reports result from the fact that the bolts permit a limited but sufficient amount of relative lateral movement of the backing plate with respect to the manifold that, upon actuation of the slide plate, the backing plate tends to move with the slide plate until resisted by the bolts and then to snap back into the original disposition of the backing plate. Regardless of the cause of such reports, the reports cause users of such slide plate diverter valves to be characteristically fearful of the possibility of valve failure and, as a result, it is quite common for users to severely over-torque the bolts in an attempt to better secure the valve but, disadvantageously, such steps may actually exacerbate the problems with sticking and inaccurate position of the slide plate as well as weakening the valve and increasing the risk of failure.

SUMMARY OF THE INVENTION

It is accordingly an object of the present invention to provide an improved slide plate diverter valve of the general type of Blanchard U.S. Pat. No. 4,334,552 which overcomes the aforedescribed disadvantages.

Briefly summarized, the present invention accomplishes this objective by providing this type of slide plate diverter valve with a suitable means for rigidifying the manifold and the backing plate with respect to one another to prevent movement of the backing plate relative to the manifold in response to sliding movement of the slide plate.

Preferably, the manifold and backing plate are rigidified by provision of a pair of shear plates disposed between the manifold and the backing plate at opposite lateral sides of the slide plate and by forming each of the shear plates as well as the manifold and the backing plate with aligned recesses in which dowels are securely seated thereby to connect each shear plate to both the manifold and the backing plate against relative movement of any thereof longitudinally and transversely of the direction of sliding movement of the slide plate.

The shear plates are of a thickness, i.e., the dimension between the manifold and the backing plate, which is essentially identical to the corresponding thickness dimension of the slide plate so that the clamping force exerted by the clamping means is shared by the slide plate and the shear plates to prevent the application of excessive clamping force on the slide plate and, in turn, to contribute to the ease of actuation of sliding movement of the slide plate. For similar purposes, the shear plates are provided with bearing plates disposed in opposed facing relation for guiding engagement with opposite longitudinal side surfaces of the slide plate.

In the preferred embodiment, each shear plate is formed with openings through its thickness which receive the bolts clamping the manifold and backing plate together.

The respective faces of the manifold and the backing plate which oppose one another to contact the opposite faces of the slide plate are formed to a predetermined minimum hardness, preferably of a value of at least about 56 measured at room temperature according to the Rockwell C Hardness Scale. To achieve this purpose, the inward slide face of the backing plate and the sealing face of the manifold are preferably formed of a nickel-based hard-surfacing alloy.

DETAILED DESCRIPTION OF THE PREFERRED EMBODIMENT

Figure 1:
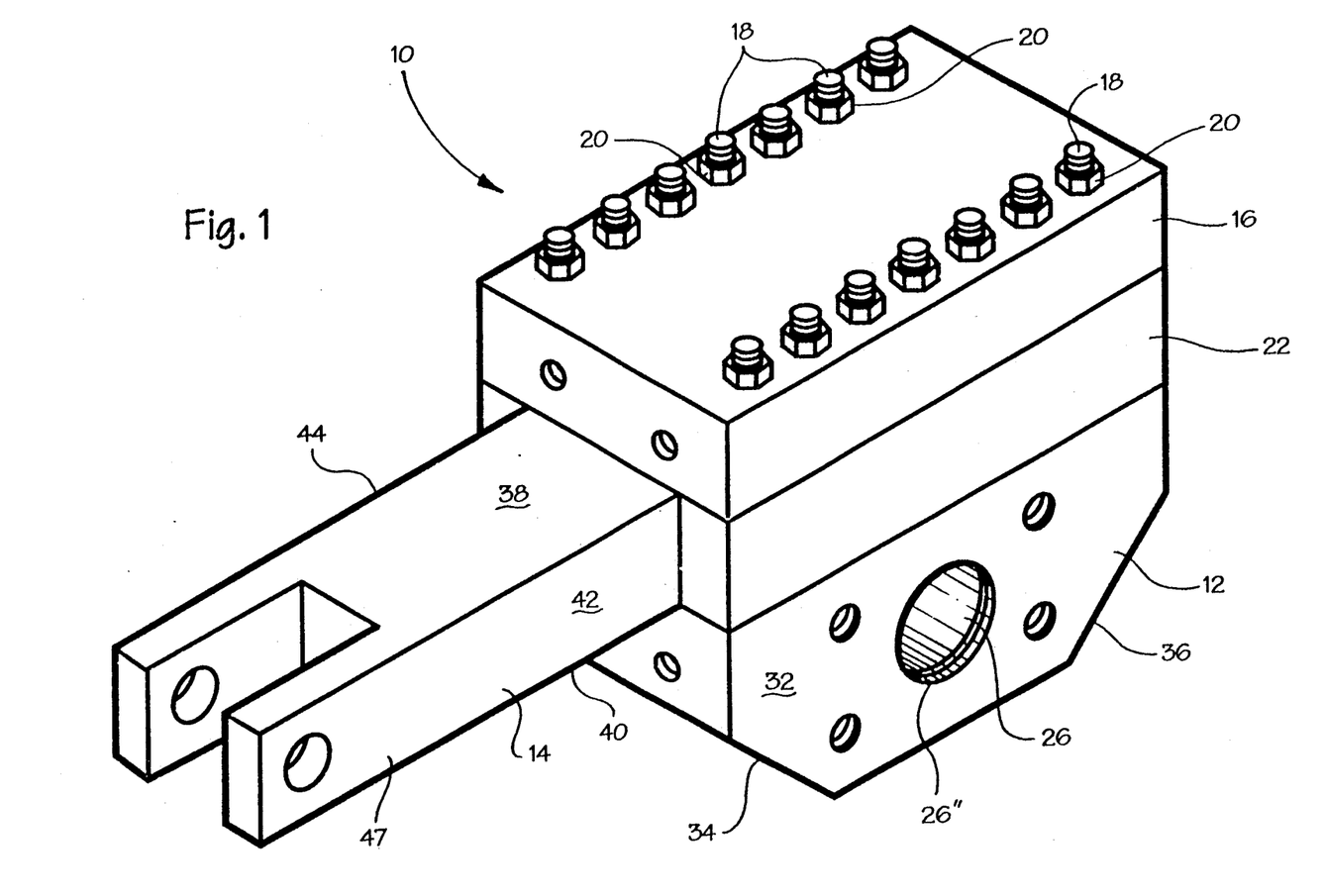
FIG. 1 is a perspective view of a diverter valve according to the preferred embodiment of the present invention.

Referring now to the accompanying drawings and initially to FIG. 1, a diverter valve constructed in accordance with the preferred embodiment of the present invention is indicated generally at 10 and basically comprises a manifold block 12 for receiving incoming fluid flow and discharging outgoing fluid flow through passageways therein as described hereinafter, a slide plate 14 which serves as a movable valve member for controlling communication between the passageways of the manifold block 12, a backing plate 16 disposed opposite the slide plate 14 from the manifold block 12 sandwiching the slide plate therebetween, and a series of bolts 18 secured by nuts 20 for clamping the backing plate 16 to the manifold block 12 to urge the slide plate 14 into sealed relationship with the manifold block 12. According to the present invention, the backing plate 16 and the manifold block 12 are rigidified with respect to one another by a pair of side rails 22 which are rigidly connected to each thereof to function as shear plates resisting such relative movement.

Figure 2:
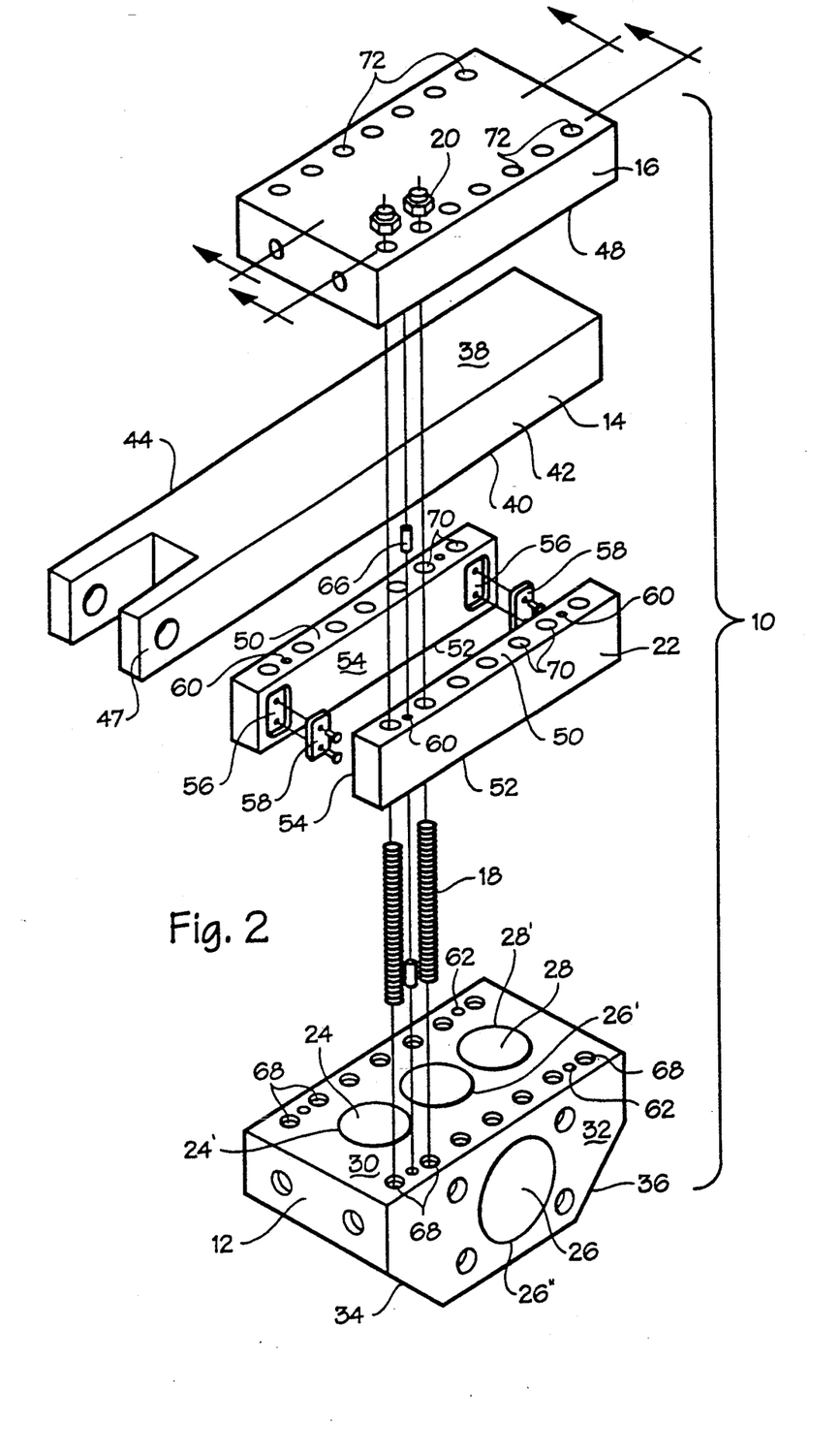
FIG. 2 is an exploded perspective view of the diverter valve of FIG. 1.
Figure 3:
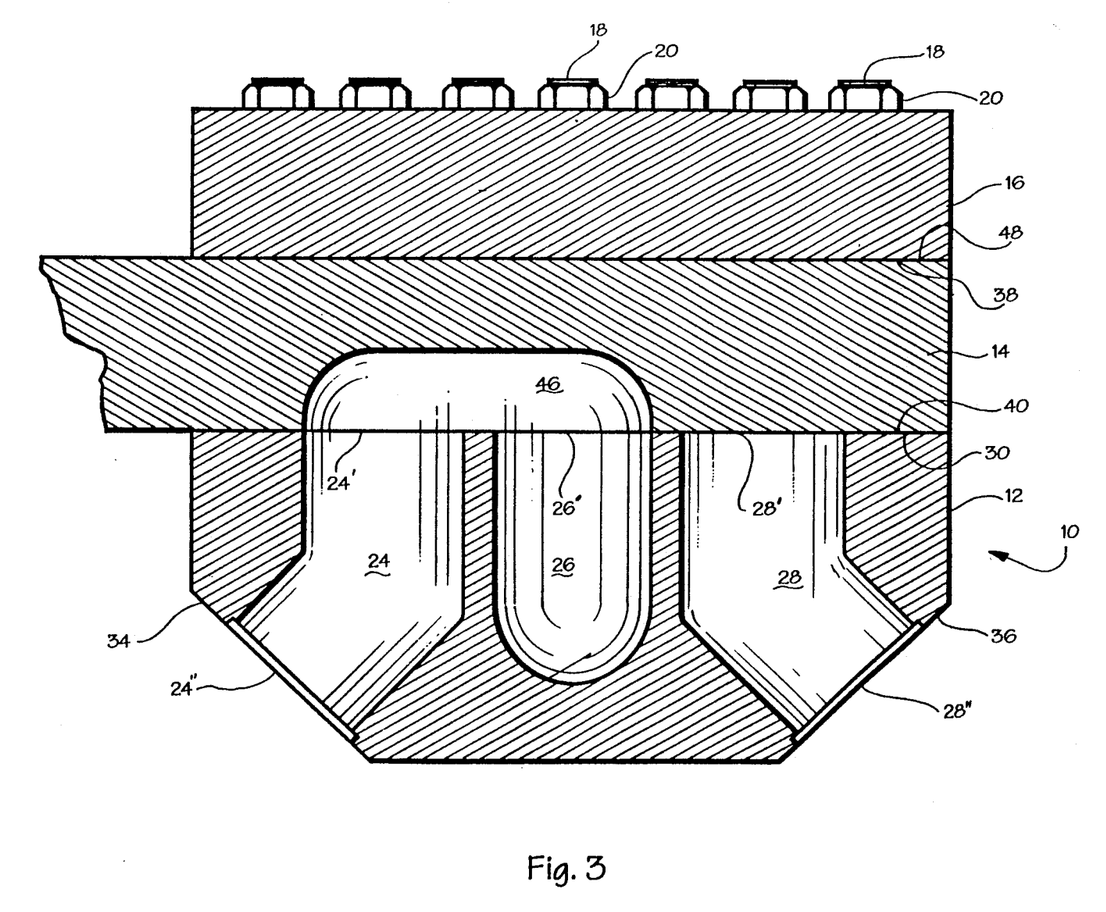
FIG. 3 is a vertical cross-sectional view of the diverter valve of FIG. 1 taken lengthwise along line 3—3 thereof.
Figure 4:
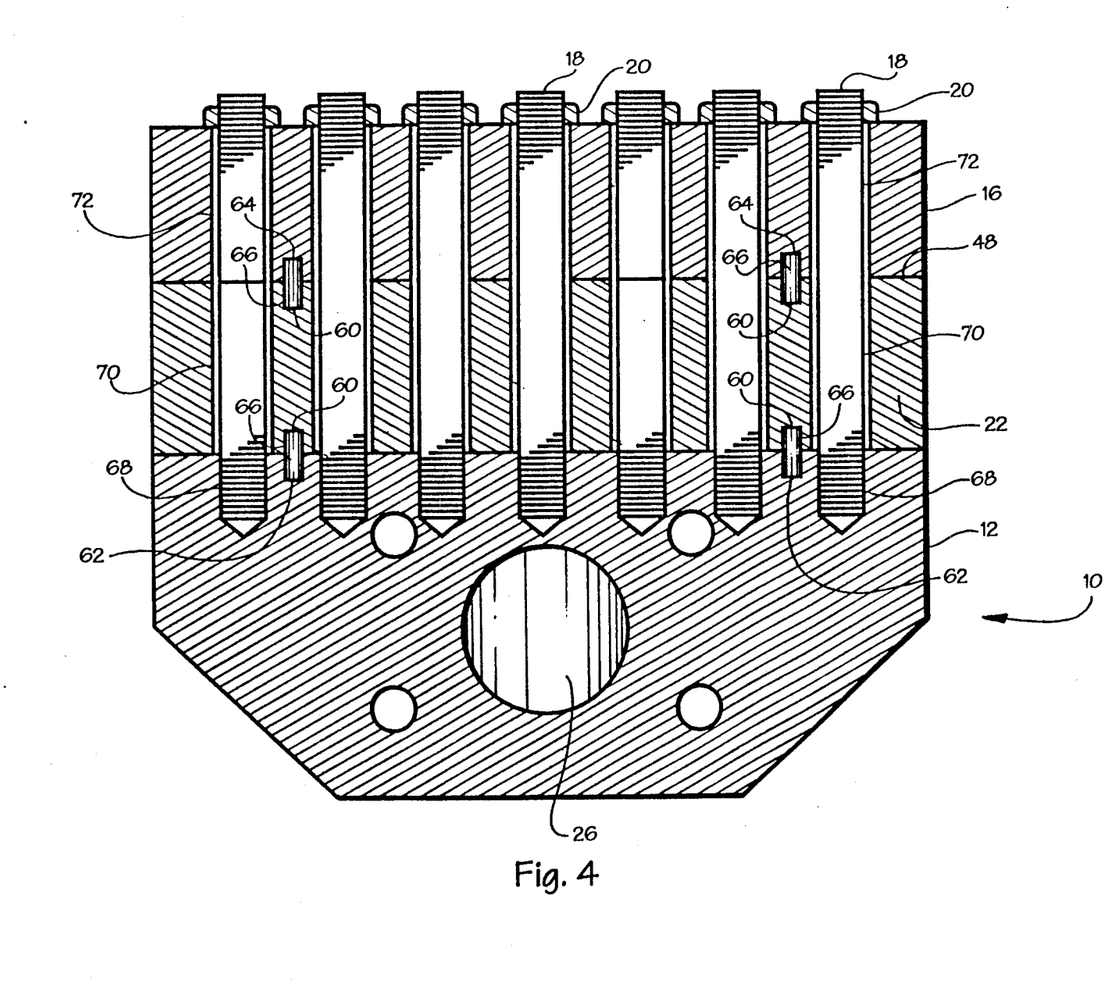
FIG. 4 is another lengthwise cross-sectional view of the diverter valve of FIG. 1 taken along line 4—4 thereof.

As best seen in FIG. 2, the manifold block 12 is formed from a solid metallic block of a parallelepiped shape the lower lengthwise face of which is symmetrically truncated angularly at the opposite ends of the block. The flat elongate upper longitudinal surface of the manifold block 12 forms a sealing face 30 for sealing surface contact with the slide plate 14. A series of three passageways 24,26,28 are formed through the valve block 12, the passageways opening at the sealing face 30 through respective ports 24',26',28' spaced equidistantly along the length of the sealing face 30, with the central passageway 26 extending therefrom through an approximately 90 degree turn to open at one lateral side face 32 of the manifold block 12 through another port 26" and with each end passageway extending angularly from its respective port 24',28' outwardly to open at a respective truncated face 34,36 of the manifold block 12 through respective ports 24",28".

The manifold block 12 is preferably formed of a low carbon steel or another suitable metallic material which, together with the mass of the manifold block 12, enables it to withstand the high temperatures and pressures described above associated with the pressurized conveyance of molten thermoplastic materials and the like. As will be understood, since the sealing face 30 will operate in surface contact with the movable slide plate 14, it is essential that the sealing face 30 be extremely hard, flat and smooth. For this purpose, the sealing face 30 is finished with a suitable surfacing to provide the desired hardness, preferably by means of a spray weld deposition of a nickel-based hard-surfacing alloy such as achieved by the "Colmonoy" surfacing produced by Wall Colmonoy Corp. of Detroit, Mich., and then the sealing face 30 is ground and lapped to a very fine degree of flatness. By way of example but with limitation, it is contemplated to be preferable for valves handling molten thermoplastic material that the surface hardness of the sealing face 30 be of a value of at least 56 as measured at room temperature according to the Rockwell C Hardness Scale.

The slide plate 14 is an elongate metallic block of parallelepiped shape having parallel upper and lower faces 38,40 and parallel lateral side faces 42,44, with the lower face 40 forming a sealing face for sealing surface engagement with the upper sealing face 30 of the manifold block 12. The sealing face 40 of the slide plate 14 is formed with an elongate lengthwise-extending recess 46 of a longitudinal dimension corresponding to the lengthwise dimension between diametrically opposite points on the ports 24",26" (which, as will be noted, is identical in dimension to the corresponding spacing between the ports 26" and 28"), of a widthwise dimension corresponding to the diameters of the ports 24",26",28", and arcuately shaped at its ends in correspondence to the circumference of the ports 24",26",28". In this manner, the recess 46 is configured to form a passageway precisely bridging the ports 24",26" or the ports 26",28" when the slide plate 14 is slidably positioned to locate the recess 46 over either such pair of ports (hereinafter referred to as the two limit positions of the slide plate 14) for pressurized fluid flow between the ports. Suitable position indicators, limit switches, or stops (not shown) may be provided to determine such limit positions of the slide plate. Importantly, the exact correspondence of the recess 46 to each bridged pair of ports in the two limit positions of the slide plate 14 serves to minimize the creation of additional turbulence in the fluid flowing between the ports and to substantially avoid any isolated regions of stagnated fluid flow.

As those persons skilled in the art will readily recognize and appreciate, the port 26" in the side face 32 may serve as either an intake or discharge port for fluid flow purposes, depending upon the particular application of the valve. In applications wherein the port 26" serves as a fluid intake port into the valve 10, the ports 24",28" serve as alternate discharge ports for fluid flow under the control of the slide plate 14. Alternatively, the ports 24",28" may serve as alternative intake ports into the valve 10, with the slide plate 14 controlling diversion of the two incoming fluid flows to the common discharge port 26".

The slide plate 14 is preferably fabricated of hot work tool steel or a corresponding metallic material suitable to withstand the high temperatures and pressures associated with operation of the valve in handling molten thermoplastic material. Likewise, it is equally important that the respective faces 38,40 and 42,44 be extremely flat, smooth and parallel with one another to achieve a satisfactory zero clearance metal-to-metal interface seal between the sealing face 40 of the slide plate 14 and the sealing face 30 of the manifold 12, as well as to best facilitate smooth sliding movement of the slide plate 14 and, for this purpose, the respective surfaces of the slide plate 14 are lapped to extremely close tolerances. One end of the slide plate 14 is formed with a clevis portion 47 for connection of the slide plate 14 to a suitable linear actuator (not shown) for actuating sliding movements of the slide plate 14 between its limit positions.

The backing plate 16 is also formed of a parallelepiped block of a suitable metallic material, such as a low carbon steel, the lateral and longitudinal dimensions of the backing plate 16 corresponding to that of the upper sealing face 30 of the manifold block 12. For suitable flatness and hardness, the lower face 48 of the backing plate 16, which is in metal-to-metal sliding surface contact with the upper face 38 of the slide plate 14, is lapped and finished with a hardened surfacing, such as the same spray weld deposit of the "Colmonoy" nickel-based hard-surfacing alloy formed on the sealing face 30 of the manifold block 12.

Each of the side rails 22 is an elongate parallelepiped metal bar, which may also be hot work tool steel or a like suitable metal, of a lengthwise dimension corresponding to that of the manifold block 12 and the backing plate 16 and a vertical thickness or height identical to that of the slide plate 14, for which purpose the upper and lower surfaces 50,52 are lapped to extremely close tolerances to correspond precisely in flatness and dimension to the vertical thickness of the slide plate 14. The respective inwardly-facing lateral side surfaces 54 of the side rails 22 are formed with recesses 56 adjacent their opposite ends, with an aluminum bronze bearing plate 58 being fittedly inserted into each recess 56 for guiding engagement with the opposite lateral side faces 42,44 of the slide plate 14.

Each of the upper and lower surfaces 50,52 of each of the side rails 22 are formed with a pair of recesses 60 and, correspondingly, each opposite lateral side of the upper sealing face 30 of the manifold block 12 and of the lower face 48 of the backing plate 16 are formed with a correspondingly-located pair of recesses 62,64 which align with the side rail recesses 60. These recesses 60,62,64 are respectively fitted snugly with a total of eight dowel pins 66 which connect and secure the side rails 22 to the manifold block 12 and the backing plate 16 rigidly against relative movement thereof both longitudinally and transversely with respect to the direction of sliding movement of the slide plate 14.

The opposite longitudinal sides of the upper sealing face 40 of the manifold block are also formed with a plurality of threaded bores 68 in alignment with the dowel recesses 62 and the side rails 22 and the backing plate 16 are formed with a correspondingly spaced plurality of unthreaded bores 70,72 which align with one another and with the threaded bores 68. The threaded bolts 18 extend downwardly through the bores 70,72 in the backing plate 16 and the side rails 22 and are threadedly engaged in the threaded bores 68 in the manifold block 12, with the upper ends of the bolts 18 extending exposed upwardly beyond the upper surface of the backing plate 16 whereat the nuts 20 threadedly engage the exposed end of the bolts 18. The nuts 20 are tightened on the exposed ends of the bolts 18 to a predetermined torque to exert a predetermined clamping force securing the manifold block 12, the backing plate 16 and the side rails 22 together and urging the slide plate 14 into zero clearance metal-to-metal sealing engagement of its lower sealing face 40 with the sealing face 30 of the manifold block 12.

Since the vertical thickness dimension and flatness of the side rails 22 are identical to that of the slide plate 14, the clamping force of the nut and bolt assemblies 18,20 is fully applied directly to the slide plate 14 to achieve an effective seal against fluid leakage while, at the same time, the side rails 22 effectively share the clamping load with the slide plate 14 so that the force required to actuate sliding movement of the slide plate 14 between its limit positions is minimized.

The provision of the dowel pins 66 seated in the respective recesses 60,62,64 of the manifold block 12, the backing plate 16 and the side rails 22 effectively rigidifies these components with respect to one another to resist any tendency for relative movement of the backing plate 16 during sliding actuation of the slide plate 14, which should minimize or eliminate the occurrence of loud reports from the valve 10 as have been experienced with conventional slide plate diverter valves. At the same time, the present diverter valve 10 should be relatively safer and less subject to the risk of potential failure than such conventional diverter valves while still being just as reliable in operation and just as effective in sealing against fluid leakage as conventional diverter valves.

An additional advantage of the present diverter valve 10 over conventional slide plate diverter valves is that the present valve is not contemplated to have any need for periodic lubrication over its serviceable life, beyond the original lubrication of the component parts performed during manufacturing assembly, thus enabling the elimination of any lubrication fitting such as typically provided with conventional valves.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In a slide plate diverter valve of the type comprising a manifold having a sealing face and defining inlet and outlet fluid flow passages opening through respective inlet and outlet ports at said sealing face of said manifold, a slide plate having a sealing face and defining a fluid flow passageway at said sealing face of said slide plate, a backing plate, said slide plate being sandwiched between said backing plate and said manifold with the respective said sealing faces of said manifold and said slide plate in facing relation, and means for clamping said manifold and said backing plate together to urge the respective said sealing faces of said manifold and said slide plate into sealing engagement while permitting sliding movement of said slide plate for selectively communicating said inlet and outlet fluid flow passages of said manifold, the improvement comprising means for rigidifying said manifold and said backing plate relative to said manifold in response to sliding movement of said slide plate, said rigidifying means comprising a pair of shear plates disposed between said manifold and said backing plate at opposite lateral sides of said slide plate and means connecting each said shear plate to each of said manifold and said backing plate against relative movement thereof longitudinally and transversely of the direction of sliding movement of said slide plate.

2. An improved slide plate diverter valve according to claim 1 wherein said connecting means comprises a plurality of aligned recesses formed respectively in each of said shear plates and said manifold and said backing plate and a plurality of dowels securely seated in said aligned recesses.

3. In a slide plate diverter valve of the type comprising a manifold having a sealing face and defining inlet and outlet fluid flow passages opening through respective inlet and outlet ports at said sealing face of said manifold, a slide plate having a sealing face and defining a fluid flow passageway at said sealing face of said slide plate, a backing plate, said slide plate being sandwiched between said backing plate and said manifold with the respective said sealing faces of said manifold and said slide plate in facing relation, and means for clamping said manifold and said backing plate together to urge the respective said sealing faces of said manifold and said slide plate into sealing engagement while permitting sliding movement of said slide plate for selectively communicating said inlet and outlet fluid flow passages of said manifold, the improvement comprising means for rigidifying said manifold and said backing plate with respect to one another to prevent movement of said backing plate relative to said manifold in response to sliding movement of said slide plate, said rigidifying means comprising a pair of shear plates disposed between said manifold and said backing plate at opposite lateral sides of said slide plate.

4. An improved slide plate diverter valve according to claim 1 or 3 wherein said clamping means extends through said rigidifying means.

5. An improved slide plate diverter valve according to claim 1 or 3 wherein said clamping means comprises a plurality of bolts clampingly connecting said manifold and said backing plate along opposite lateral sides of said slide plate and said shear plates are formed with openings which receive said bolts.

6. An improved slide plate diverter valve according to claim 1 or 3 wherein said shear plates are of a dimension between said manifold and said backing plate essentially identical to the corresponding dimension of said slide plate so that the clamping force exerted by said clamping means is shared by said slide plate and said shear plates for ease of actuating sliding movement of said slide plate.

7. An improved slide plate diverter valve according to claim 1 or 3 wherein said shear plates have bearing plates disposed in opposed facing relation for guiding engagement with opposite longitudinal side surfaces of said slide plate.

8. An improved slide plate diverter valve according to claim 1 or 3 wherein said backing plate has a slide face in opposed facing relation to said sealing face of said manifold, and said slide face of said backing plate and said sealing face of said manifold are of a predetermined minimum hardness.

9. An improved slide plate diverter valve according to claim 8 wherein the hardness of said slide face of said backing plate and said sealing face of said manifold is a value of at least about 56 measured at room temperature according to the Rockwell C Hardness Scale.

10. An improved slide plate diverter valve according to claim 8 wherein said slide face of said backing plate and said sealing face of said manifold are formed of a nickel-based hard-surfacing alloy.

11. An improved slide plate diverter valve according to claim 1 or 3 wherein said manifold, said slide plate and said backing plate are formed of metal capable of withstanding temperatures in excess of about 400 degrees Fahrenheit and said clamping means exerts a clamping force capable of precluding fluid leakage between said sealing faces of said manifold and said slide plate in excess of about 1000 PSI.

12. In a slide plate diverter valve of the type comprising a manifold having a sealing face and defining inlet and outlet fluid flow passages opening through respective inlet and outlet ports at said sealing face of said manifold, a slide plate having a sealing face and defining a fluid flow passageway at said sealing face of said slide plate, a backing plate, said slide plate being sandwiched between said backing plate and said manifold with the respective said sealing faces of said manifold and said slide plate in facing relation, and a plurality of bolts connecting said manifold and said backing plate along opposite lateral sides of said slide plate for clamping said manifold and said backing plate together to urge the respective said sealing faces of said manifold and said slide plate into sealing engagement while permitting sliding movement of said slide plate for selectively communicating said inlet and outlet fluid flow passages of said manifold, and wherein said manifold, said slide plate and said backing plate are formed of metal capable of withstanding temperatures in excess of about 400 degrees Fahrenheit and said clamping means exerts a clamping force capable of precluding fluid leakage between said sealing faces of said manifold and said slide plate in excess of about 1000 PSI, the improvement comprising means for rigidifying said manifold and said backing plate with respect to one another to prevent movement of said backing plate relative to said manifold in response to sliding movement of said slide plate, said rigidifying means comprising a pair of shear plates disposed between said manifold and said backing plate at opposite lateral sides of said slide plate, said shear plates being formed with openings which receive said bolts and said shear plates being of a dimension between said manifold and said backing plate essentially identical to the corresponding dimension of said slide plate so that the clamping force exerted by said clamping means is shared by said slide plate and said shear plates for ease of actuating sliding movement of said slide plate, and means connecting each said shear plate to each of said manifold and said backing plate against relative movement thereof longitudinally and transversely of the direction of sliding movement of said slide plate, said connecting means comprising a plurality of aligned recesses formed respectively in each of said shear plates and said manifold and said backing plate and a plurality of dowels securely seated in said aligned recesses.

13. An improved slide plate diverter valve according to claim 12 wherein said shear plates have bearing plates disposed in opposed facing relation for guiding engagement with opposite longitudinal side surfaces of said slide plate.

14. An improved slide plate diverter valve according to claim 12 wherein said backing plate has a slide face in opposed facing relation to said sealing face of said manifold, and said slide face of said backing plate and said sealing face of said manifold are of a predetermined minimum hardness.

15. An improved slide plate diverter valve according to claim 14 wherein the hardness of said slide face of said backing plate and said sealing face of said manifold is a value of at least about 56 measured at room temperature according to the Rockwell C Hardness Scale.

16. An improved slide plate diverter valve according to claim 15 wherein said slide face of said backing plate and said sealing face of said manifold are formed of a nickel based hard-surfacing alloy.

* * * * *

UNITED STATES PATENT AND TRADEMARK OFFICE
CERTIFICATE OF CORRECTION

PATENT NO. : 5,295,510

DATED : March 22, 1994

INVENTOR(S) : Michael G. Bolling, Robert S. French and R. Steven Rivenbark

It is certified that error appears in the above-identified patent and that said Letters Patent is hereby corrected as shown below:

Column 4, line 3, delete "with" and insert therefor -- without --.

Column 5, line 25, between "aluminum" and "bronze" insert -- - --.

Column 6, line 64, after "plate" insert -- with respect to one another to prevent movement of said backing plate --.

Column 7, lines 15-16, delete "fluid flow passages opening through respective inlet and outlet".

Column 10, line 6, between "nickel" and "based" insert -- - --.

Signed and Sealed this

Twenty-seventh Day of September, 1994

Attest:

BRUCE LEHMAN

Attesting Officer

Commissioner of Patents and Trademarks